(12) United States Patent
Ricketts

(10) Patent No.: US 11,375,664 B2
(45) Date of Patent: Jul. 5, 2022

(54) AGRICULTURAL HEADER WITH LINEARLY DISPLACEABLE FLEX ARMS

(71) Applicant: CNH Industrial America LLC, New Holland, PA (US)

(72) Inventor: Jonathan E. Ricketts, Davenport, IA (US)

(73) Assignee: CNH Industrial America LLC, New Holland, PA (US)

( * ) Notice: Subject to any disclaimer, the term of this patent is extended or adjusted under 35 U.S.C. 154(b) by 222 days.

(21) Appl. No.: 16/686,114

(22) Filed: Nov. 16, 2019

(65) Prior Publication Data

US 2021/0144920 A1 May 20, 2021

(51) Int. Cl.
| | | |
|---|---|---|
| *A01D 41/14* | (2006.01) | |
| *A01D 34/04* | (2006.01) | |
| *A01D 34/28* | (2006.01) | |
| *A01D 34/24* | (2006.01) | |

(52) U.S. Cl.
CPC ........... *A01D 41/141* (2013.01); *A01D 34/04* (2013.01); *A01D 34/243* (2013.01); *A01D 34/283* (2013.01); *A01D 41/145* (2013.01)

(58) Field of Classification Search
CPC .... A01D 41/141; A01D 34/04; A01D 41/145; A01D 34/283; A01D 34/243
See application file for complete search history.

(56) References Cited

U.S. PATENT DOCUMENTS

| | | | |
|---|---|---|---|
| 383,660 A | 5/1888 | Search | |
| 1,893,863 A | 1/1933 | Kerns | |
| 2,750,727 A * | 6/1956 | Wright | A01D 41/141 56/208 |
| 3,698,164 A * | 10/1972 | Boone | A01D 41/141 56/10.4 |
| 3,736,737 A * | 6/1973 | Schumacher, II | A01D 41/141 56/208 |
| 3,886,718 A * | 6/1975 | Talbot | A01D 41/141 56/208 |
| 4,204,383 A * | 5/1980 | Milliken, Jr. | A01D 41/141 56/10.2 E |
| 4,206,583 A * | 6/1980 | Week | A01D 41/14 56/15.8 |
| 4,206,584 A * | 6/1980 | Johnson | A01D 41/14 56/15.8 |
| 4,676,053 A * | 6/1987 | Pruitt | A01D 67/00 172/466 |
| 5,157,905 A * | 10/1992 | Talbot | A01D 41/14 56/15.9 |
| 6,415,589 B1 * | 7/2002 | Yribarren | A01D 46/14 56/41 |

(Continued)

FOREIGN PATENT DOCUMENTS

CN 105766200 A 7/2016

*Primary Examiner* — Arpad Fabian-Kovacs

(74) *Attorney, Agent, or Firm* — Peter Zacharias; Patrick Sheldrake

(57) ABSTRACT

A header for an agricultural harvester includes: a header frame; a flexible cutterbar carried by the header frame; a plurality of flex arms coupled to the cutterbar; and a flex arm drive assembly coupled to at least one of the flex arms and configured to selectively, linearly displace the at least one coupled flex arm in a vertical direction relative to the header frame.

7 Claims, 4 Drawing Sheets

(56) References Cited

U.S. PATENT DOCUMENTS

| | | | |
|---|---|---|---|
| 7,520,115 B2 * | 4/2009 | Coers | A01D 41/141 56/15.8 |
| 7,661,251 B1 * | 2/2010 | Sloan | A01D 41/145 56/10.2 E |
| 7,886,511 B2 * | 2/2011 | Honas | A01D 57/20 56/181 |
| 7,987,656 B2 * | 8/2011 | Ehrhart | A01D 41/145 56/10.2 E |
| 8,028,506 B1 * | 10/2011 | Casper | A01D 46/081 56/14.2 |
| 8,051,633 B2 * | 11/2011 | Figgins | A01D 34/283 56/181 |
| 9,801,336 B2 * | 10/2017 | Palmute | A01D 34/74 |
| 2002/0059789 A1 * | 5/2002 | Koorn | A01D 43/107 56/16.4 A |
| 2003/0140609 A1 * | 7/2003 | Beaujot | A01D 41/141 56/10.2 E |
| 2006/0254232 A1 * | 11/2006 | Bomleny | A01D 41/141 56/10.2 E |
| 2006/0254233 A1 * | 11/2006 | Bomleny | A01D 41/141 56/10.2 E |
| 2007/0170669 A1 * | 7/2007 | Ehrhart | B62D 49/02 280/43.23 |
| 2008/0276590 A1 * | 11/2008 | Sauerwein | A01D 41/14 56/153 |
| 2009/0293441 A1 * | 12/2009 | Sauerwein | A01D 41/14 56/208 |
| 2010/0281837 A1 * | 11/2010 | Talbot | A01D 41/141 56/10.2 E |
| 2013/0125521 A1 * | 5/2013 | Patterson | A01D 43/04 56/14.5 |
| 2015/0271999 A1 * | 10/2015 | Enns | A01D 41/141 700/275 |
| 2018/0153101 A1 * | 6/2018 | Dunn | A01B 63/008 |
| 2018/0153103 A1 * | 6/2018 | Bravo Trinidad | A01D 46/30 |
| 2018/0271016 A1 | 9/2018 | Milano et al. | |
| 2019/0183050 A1 * | 6/2019 | Fay, II | A01D 75/004 |
| 2019/0230855 A1 * | 8/2019 | Reed | A01D 41/141 |

\* cited by examiner

AGRICULTURAL HEADER WITH LINEARLY DISPLACEABLE FLEX ARMS

BACKGROUND OF THE INVENTION

The present invention pertains to agricultural vehicles and, more specifically, to agricultural harvesters.

An agricultural harvester known as a "combine" is historically termed such because it combines multiple harvesting functions with a single harvesting unit, such as picking, threshing, separating and cleaning. A combine includes a header which removes the crop from a field, and a feeder housing which transports the crop matter into a threshing rotor. The threshing rotor rotates within a perforated housing, which may be in the form of adjustable concaves and performs a threshing operation on the crop to remove the grain. Once the grain is threshed it falls through perforations in the concaves onto a grain pan. From the grain pan the grain is cleaned using a cleaning system, and is then transported to a grain tank onboard the combine. A cleaning fan blows air through the sieves to discharge chaff and other debris toward the rear of the combine. Non-grain crop material such as straw from the threshing section proceeds through a residue system, which may utilize a straw chopper to process the non-grain material and direct it out the rear of the combine. When the grain tank becomes full, the combine is positioned adjacent a vehicle into which the grain is to be unloaded, such as a semi-trailer, gravity box, straight truck, or the like; and an unloading system on the combine is actuated to transfer the grain into the vehicle.

To remove crop material from the field, the header of the combine harvester may be equipped with a cutter bar assembly having many sharp cutting elements that reciprocate sidewardly, relative to a forward direction of travel, to sever the crop material from the field before entering the feeder housing. The header may include a rotating reel with tines or the like to sweep crop material toward the cutting elements.

A conveyance system can be carried rearwardly of the cutting elements. Two different conveyance systems are widely used to transport cut crop material toward a center of the header before proceeding to the feeder housing. The first type of conveyance system utilizes a pair of cross augers which counter-rotate to convey crop material from sides of the header toward the center. The other type of conveyance system utilizes a rotating belt, which can be referred to as a draper belt, to convey material from sides of the header toward the center. When a draper belt is used to convey crop material toward the center of the header, the header can be referred to as a "draper header."

A draper header is typically used to harvest fluffy or bushy crop material such as soy beans or canola. Many draper headers include two lateral draper belts that convey the crop material longitudinally inward and a center feed belt that conveys the crop material into the feeder housing. Each draper belt may be wrapped around rollers, for example various combinations of drive rollers and idler rollers. The draper belts may include cleats extending transversely across the full width of the header, which contact the crop material to help facilitate its transportation into the feeder housing.

Many headers, including both draper headers and cross auger headers, have a flexible cutterbar that can pivot to conform to the underlying ground surface. Flexure of the cutterbar is usually assisted by arms carried by the header, which may be referred to as "flex arms." In many known headers, the flex arms are pivotably coupled to a frame of the header and pivot in order to flex the cutterbar. While such headers are effective, there are certain situations where the cutterbar does not flex in a desired fashion.

What is needed in the art is an agricultural harvester than can address at least some of the previously described issues with known agricultural harvesters.

SUMMARY OF THE INVENTION

Exemplary embodiments disclosed herein provide a header for an agricultural harvester including a flex arm drive assembly coupled to at least one flex arm and configured to selectively, linearly displace the at least one coupled flex arm in a vertical direction.

In some exemplary embodiments provided according to the present disclosure, a header for an agricultural harvester includes: a header frame; a flexible cutterbar carried by the header frame; a plurality of flex arms coupled to the cutterbar; and a flex arm drive assembly coupled to at least one of the flex arms and configured to selectively, linearly displace the at least one coupled flex arm in a vertical direction relative to the header frame.

In some exemplary embodiments provided according to the present disclosure, an agricultural harvester includes: a chassis and a header carried by the chassis. The header includes: a header frame; a flexible cutterbar carried by the header frame; a plurality of flex arms coupled to the cutterbar; and a flex arm drive assembly coupled to at least one of the flex arms and configured to selectively, linearly displace the at least one coupled flex arm in a vertical direction relative to the header frame.

One possible advantage that may be realized by exemplary embodiments provided according to the present disclosure is that the flex arm drive assembly can be used to selectively fine tune the flex of the cutterbar.

Another possible advantage that may be realized by exemplary embodiments provided according to the present disclosure is that linearly displacing the coupled flex arm, rather than pivoting the flex arm, maintains an angle of shoes that may be connected to the cutterbar because the shoes are also linearly displaced vertically rather than pivoting through an arced motion.

BRIEF DESCRIPTION OF THE DRAWINGS

For the purpose of illustration, there are shown in the drawings certain embodiments of the present invention. It should be understood, however, that the invention is not limited to the precise arrangements, dimensions, and instruments shown. Like numerals indicate like elements throughout the drawings. In the drawings.

DETAILED DESCRIPTION OF THE INVENTION

Figure 1:
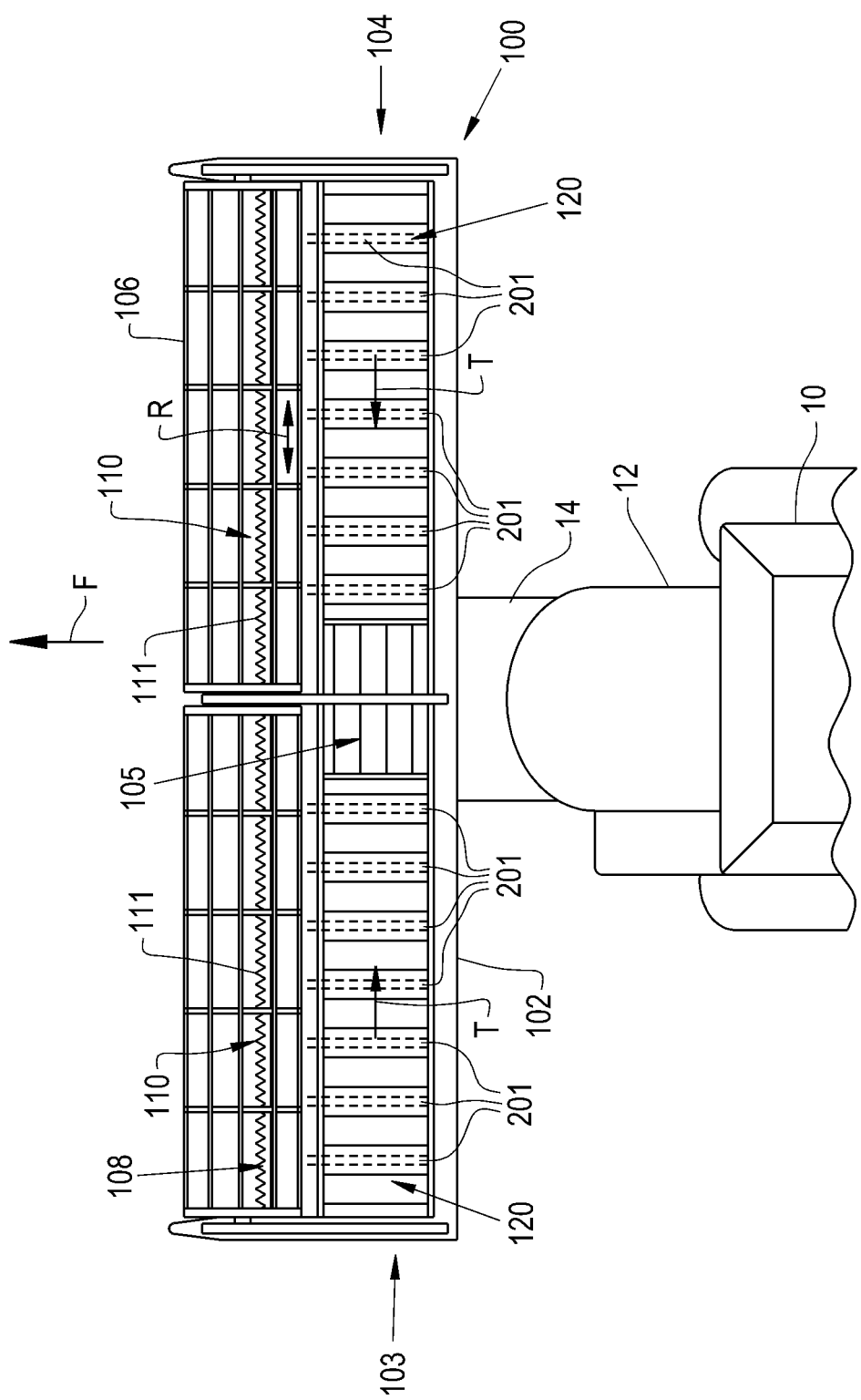
FIG. 1 illustrates a top view of an agricultural harvester shown in the form of a combine harvester including a header, in accordance with an exemplary embodiment of the present invention.

Referring now to the drawings, and more particularly to FIG. 1, there is shown an exemplary embodiment of an agricultural harvester 10 in the form of a combine harvester which generally includes a chassis 12, a feeder house 14, and an attachment in the form of a header 100. Typically, the combine harvester 10 will include additional internal systems for the separation and handling of collected crop material, but these additional systems are omitted from view for brevity of description. It should be appreciated that the header 100 described and illustrated herein does not necessarily need to be included on combine harvesters, but can be incorporated in other agricultural vehicles such as windrowers.

The header 100 is coupled to, and therefore carried by, the chassis 12 of the agricultural harvester 10 by, for example, coupling to the feeder housing 14. In the exemplary embodiment shown, the header 100 is in the form of a draper header 100 to harvest bushy or fluffy crop material. The draper header 100 has a header frame 102 coupled to the chassis 12 by coupling to the feeder house 14 and a pair of opposed lateral ends 103, 104. The draper header 100 supports one or more flexible portions of flexible cutterbars 110 with reciprocating knives 111 to cut crop material as the agricultural harvester 10 travels in a forward direction, denoted by arrow F. The reciprocating knives 111, which may be referred to as cutting elements, can be reciprocated back-and-forth in a lateral direction, denoted by arrow R, relative to the forward direction F in any known manner, e.g., by a wobble box, epicyclic drive, etc. The draper header 100 may further include a center feed belt 105 or a center auger that conveys the crop material into the feeder house 14. The draper header 100 may also include one or more lateral, flexible draper belts 120 that are positioned rearwardly of the cutterbars 110 and travel, i.e. rotate, in opposing directions of travel, denoted by each arrow "T", in order to convey the crop material inwardly to the center feed belt 105 and thereby the feeder house 14. The header 100 may also include a rotating reel 106 with tines or the like to sweep the crop material inwardly. It should be appreciated that while the header 100 described and illustrated herein is shown in the form of a draper header incorporating draper belts 120, in some alternative embodiments the header 100 can incorporate a pair of counter-rotating or co-rotating augers or a single conveying auger.

Figure 2A:
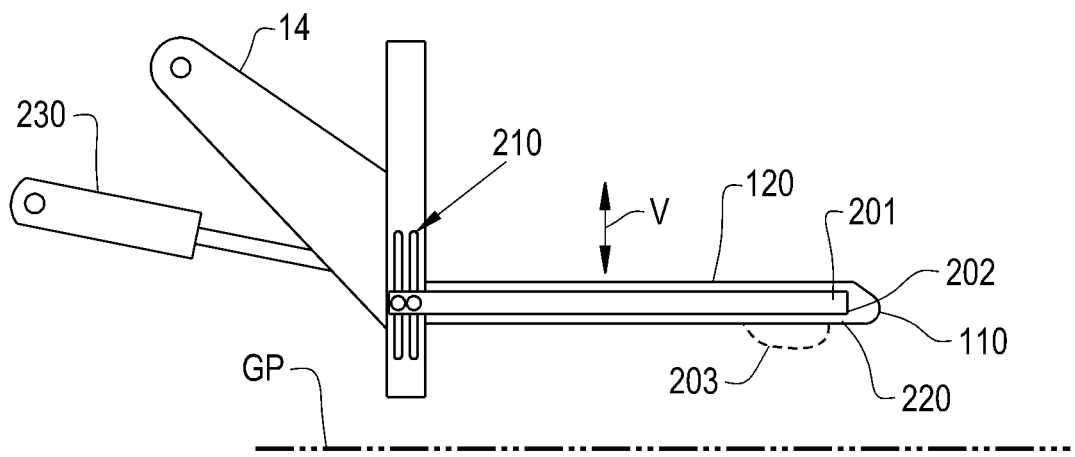
FIG. 2A illustrates a sectional side view of an exemplary embodiment of the header illustrated in FIG. 1.
Figure 2B:
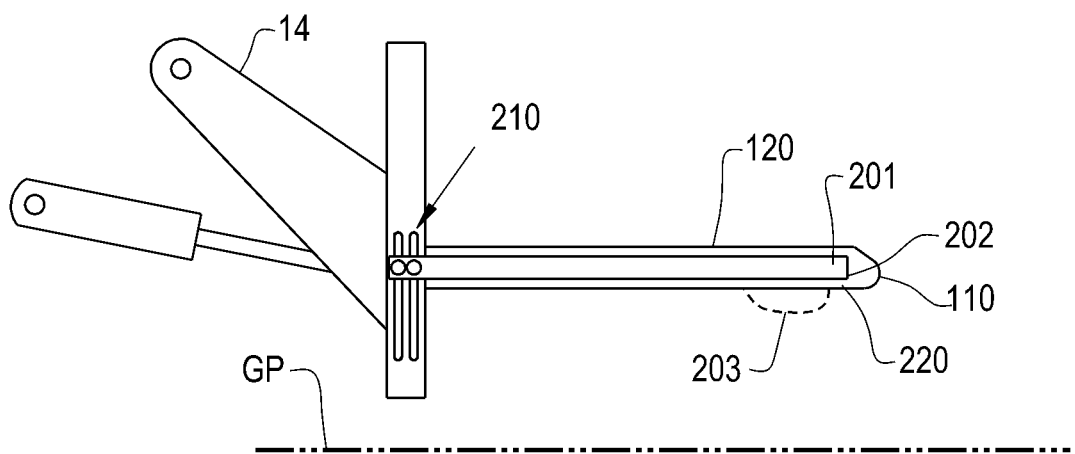
FIG. 2B illustrates the header of FIG. 2A after vertical displacement of a flex arm.

To flex a portion of the cutterbars 110, and referring now to FIGS. 2A and 2B as well, the header 100 includes a plurality of flex arms 201 that are coupled to the cutterbar 110. The flex arms 201 may, for example, be disposed under the draper belts 120 and act to also support the belts 120 during harvesting. In some embodiments, each of the flex arms 201 comprise an elongated metal arm that couples to the cutterbar 110 at an end 202 of the flex arm 201, as is known. When the flex arm 201 moves, the portion of the cutterbar 110 adjacent to the end 202 of the flex arm 201 also tends to move, which allows the cutterbar 110 to follow the contour of a ground plane below the cutterbar 110 and is commonly referred to as "float."

To vertically displace the flex arm 201, and thus the portion of the cutterbar 110 adjacent to the end 202 of the flex arm 201, the header 100 includes a flex arm drive assembly 210 that is coupled to the flex arm 201 and configured to selectively, linearly displace the coupled flex arm 201 in a vertical direction V relative to the header frame 102. As used herein, the coupled flex arm 201 is "linearly" displaced in the sense that displacement of the flex arm 201 occurs along an axis and/or in a plane, rather than being along an arc. The vertical displacement may be, for example, along an axis and/or plane that extends perpendicularly to a ground plane GP on which the harvester 100 is traveling so substantially all displacement of the flex arm 201 is in the vertical direction V. It should be appreciated, however, that displacement of the flex arm 201 may be non-perpendicular to the ground plane GP so the flex arm 201 travels both vertically and horizontally relative to the ground plane GP. Vertical displacement of the flex arm 201 in the vertical direction V upwardly, i.e., away from the ground plane GP, is illustrated by FIG. 2B showing the flex arm 201 further from the ground plane GP than in FIG. 2A. The vertical displacement of the flex arm 201 also causes a corresponding vertical displacement of a portion of the cutterbar 110, allowing that portion of the cutterbar 110 to move further from the ground plane GP to, for example, avoid colliding with a raised portion of the ground plane GP or an object in front of the header 100. As can be seen, an angle of cutterbar shoes 203 is not affected by the linear vertical displacement of the cutterbar 110, eliminating the need to adjust the angle of the cutterbar shoes 203 after raising or lowering the flex arm 201.

Figure 3:
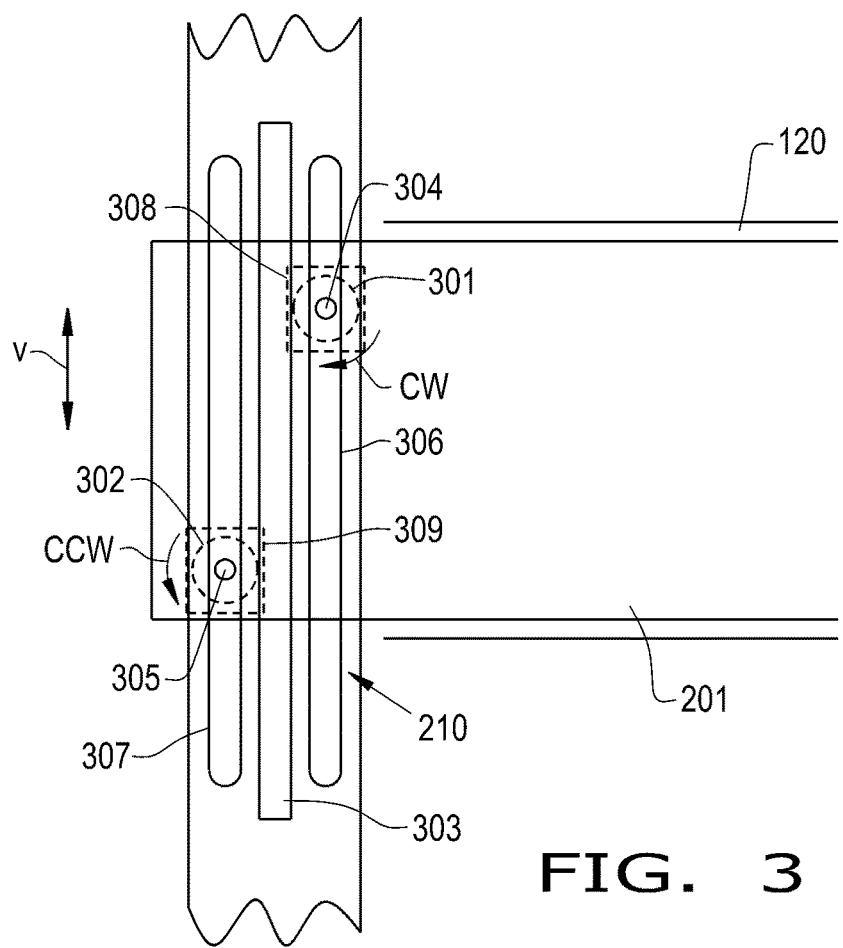
FIG. 3 illustrates a close-up side view of a flex arm drive assembly of the header illustrated in FIGS. 1-2B.

Referring now to FIG. 3, the flex arm drive assembly 210 is illustrated in greater detail. In some embodiments, the flex arm drive assembly 210 includes at least one gear, illustrated as a first gear 301 and a second gear 302, engaged with a gear rail 303. The gear(s) 301, 302 are directly coupled to the flex arm 201, with the flex arm 201 then being coupled to the gear rail 303 via engagement of the gear(s) 301, 302 with the relatively static gear rail 303, as illustrated in FIG. 3. While the gears 301, 302 are illustrated and described as being coupled to a single flex arm 201, it should be appreciated that the gears 301, 302 can be coupled to multiple flex arms 201.

The gears 301, 302 are configured to rotate. Rotation of the gears 301, 302 causes the gears 301, 302 to linearly travel along the gear rail 303 in a rack-and-pinion fashion. To allow the gears 301, 302 to linearly travel along the gear rail 303, each of the gears 301, 302 may have a respective gear shaft 304, 305 disposed in a respective gear shaft channel 306, 307. The gear shafts 304, 305 may be coupled to the flex arm 201 to couple the flex arm 201 to the gears 301, 302. As the gears 301, 302 linearly travel along the gear rail 303, the coupling of the gears 301, 302 to the flex arm 201 causes a corresponding linear displacement the flex arm 201. In this respect, the linear displacement of the flex arm 201 occurs in the vertical direction V due to the gear rail 303 extending in the vertical direction V. Thus, it should be appreciated that the linear displacement characteristics of the flex arm 201 can be adjusted by adjusting the orientation of the gear rail 303.

To ensure that the flex arm 201 travels along the gear rail 303, rather than being stuck in place, the gears 301, 302 may be configured to counter-rotate, e.g., the first gear 301 may be configured to rotate clockwise (denoted by arrow CW) and the second gear 302 may be configured to rotate counter-clockwise (denoted by arrow CCW). In some embodiments, one or more motors, illustrated as two motors 308 and 309, are coupled to the gears 301, 302 to selectively rotate the gears 301, 302. As illustrated in FIG. 3, the flex arm drive assembly 210 includes a first motor 308 that is coupled to the first gear 301 and configured to selectively rotate the first gear 301 clockwise CW and a second motor 309 that is coupled to the second gear 302 and configured to selectively rotate the second gear 302 counter-clockwise CCW. The motors 308, 309 may rotate the gears 301, 302 in one direction to raise the coupled flex arm 201, and rotate the gears 301, 302 in the opposite direction to lower the coupled flex arm 201. Coupling each gear 301, 302 to a respective motor 308, 309 allows selective activation of the motors 308, 309 to control the linear displacement of the coupled flex arm 201 in the vertical direction V. It should be appreciated that while multiple motors 308, 309 are illustrated, in some embodiments the flex arm drive assembly 210 includes a single motor that causes rotation of one (or multiple) of the gears 301, 302 to cause vertical displacement of the coupled flex arm 201.

Figure 4:
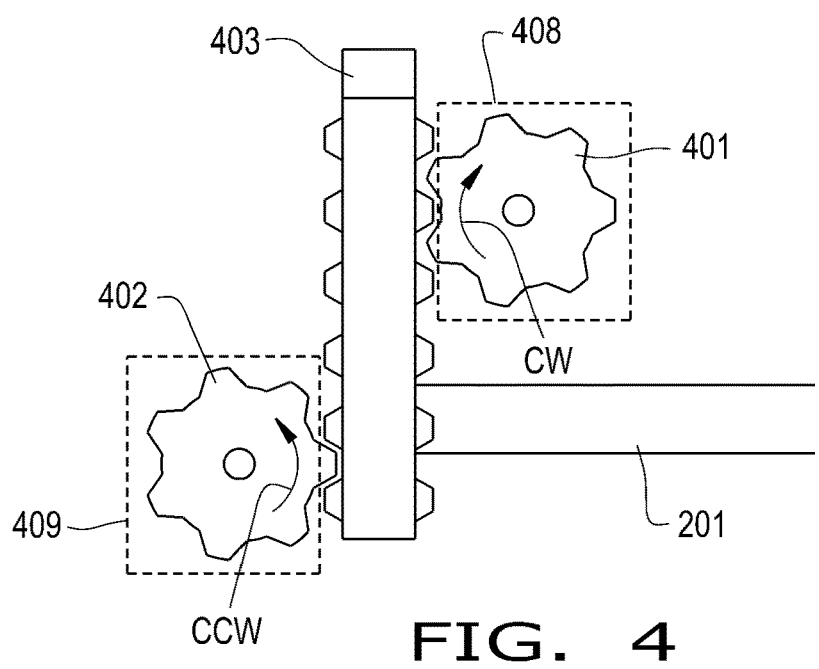
FIG. 4 illustrates a side view of another exemplary embodiment of a flex arm drive assembly including a gear rail and a pair of gears that may be incorporated in the header illustrated in FIGS. 1-2B.

In some embodiments, and referring now to FIG. 4, a gear rail 403 may be directly coupled to the flex arm 201 and movable relative to static gears 401, 402. It should be appreciated that, in some embodiments, the gear rail 403 is coupled to multiple flex arms 201. There is still a rack-and-pinion movement in such an embodiment, but it is movement of the gear rail 403 along the gears 401, 402, rather than vice-versa, which causes the corresponding vertical displacement of the coupled flex arm 201. Similarly to the previously described gears 301, 302, each of the gears 401, 402 may be coupled to a respective motor 408, 409 that is configured to selectively rotate the respectively coupled gear 401, 402 to cause vertical displacement of the coupled flex arm 201. The motors 408,409 may also be configured to cause counter-rotation of the gears 401, 402, e.g., the gear 401 may rotate in a clockwise direction CW and the gear 402 may rotate in a counter-clockwise direction CCW to vertically displace the coupled flex arm 201 in one vertical direction. It should thus be appreciated that the flex arm 201 may be vertically displaced in a variety of ways using gears and a gear rail.

Figure 5:
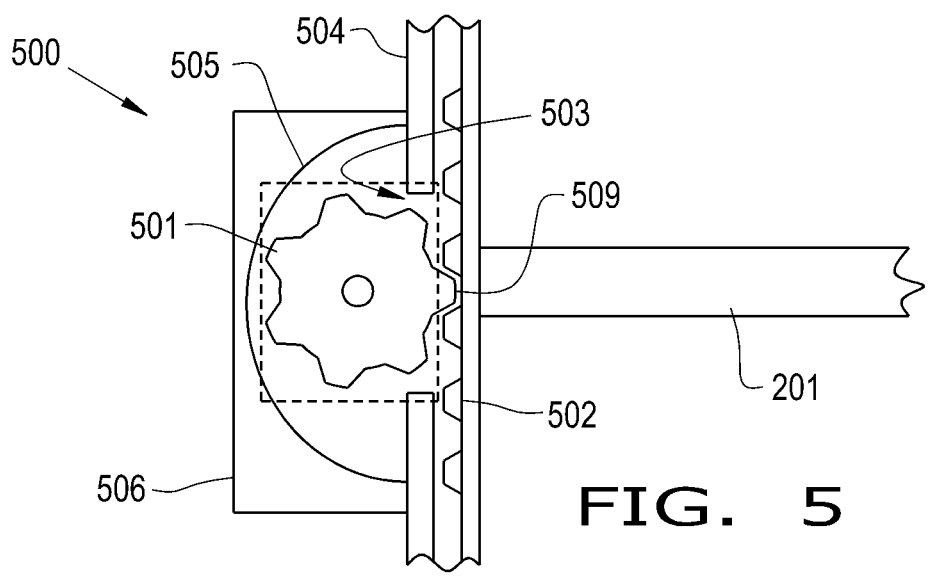
FIG. 5 illustrates a side view of another exemplary embodiment of a flex arm drive assembly including a gear rail and a single gear that may be incorporated in the header illustrated in FIGS. 1-2B.
Figure 6:
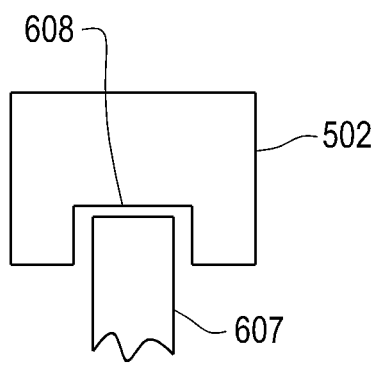
FIG. 6 illustrates a close-up view of a tooth of the gear and gear rail of the flex arm drive assembly illustrated in FIG. 5.

In some embodiments, and referring now to FIGS. 5 and 6, a flex arm drive assembly 500 is provided that includes a single gear 501 engaged with a gear rail 502. As illustrated, the gear 501 and the gear rail 502 can be engaged in an opening 503 of a slide surface 504 between the gear 501 and the gear rail 502. The gear 501 can be disposed in a gear recess 505 of a block 506 that bears against the slide surface 504 to distribute load. As illustrated in FIG. 6, teeth 607 of the gear 501 are disposed in gear tracks 608 of the gear rail 502 such that rotation of the gear 501 displaces the gear rail 502. The flex arm 201 may thus be coupled to the gear rail 502 so rotation of the gear 501 causes vertical displacement of the flex arm 201. A gear motor 509 may be coupled to the gear 501 to rotate the gear 501 and displace the gear rail 502 and the coupled flex arm 201. It should thus be appreciated that the flex arm drive assembly 210, 500 provided according to the present disclosure may have many different configurations to vertically displace the coupled flex arm 201.

Figure 7:
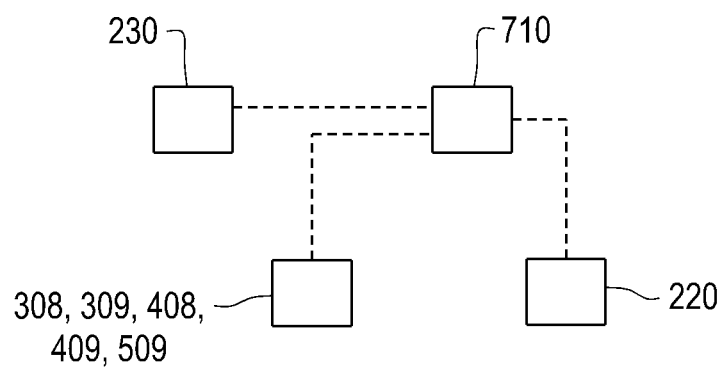
FIG. 7 illustrates a schematic view of a controller that may be incorporated in the agricultural harvester illustrated in FIG. 1.

Referring again to FIGS. 2A and 2B, and now to FIG. 7 as well, in some embodiments the header 110 includes a float sensor 220 that is configured to output float signals corresponding to a clearance of at least a portion of the cutterbar 110 relative to the ground plane GP. The float sensor 220 may be, for example, an optical sensor or other type of sensor that allows the float sensor 220 to detect how close the cutterbar 110 is to the ground plane GP. Many such float sensors are known, so further description of the float sensor 220 is omitted for brevity.

The float sensor 220 may be operably coupled to a controller 710, illustrated in FIG. 7, of the harvester 10. The controller 710 may be, for example, part of an ISOBUS system of the harvester 10 and configured to control multiple functions of the harvester 10, including flexure of the cutterbar 110 and, in some embodiments, height control of the header 100. The controller 710 may operably coupled to one or more of the motors 308, 309, 408, 409, 509 and configured to output a gear motor drive signal to the motor(s) 308, 309, 408, 409, 509 to cause selection rotation of one or more of the gears 301, 302, 401, 402, 501. In this sense, the controller 710 may be configured to control vertical displacement of the flex arm 201 by controlling the motor(s) 308, 309, 408, 409, 509 to rotate the gear(s) 301, 302, 401, 402, 501.

In some embodiments, the controller 710 is configured to determine a float adjustment by the at least one coupled flex arm 201 to float at least the portion of the cutterbar 110 at a defined level. For example, the controller 710 may be configured to determine the float adjustment that is needed so at least the portion of the cutterbar 110 is 6 inches above the ground plane GP to maintain a uniform crop cut height during operation. The controller 710 can determine the float adjustment that is needed by comparing the clearance of the portion of the cutterbar 110 to the defined level; if the portion of the cutterbar 110 is 8 inches above the ground plane GP, for example, the controller 710 can determine that the float adjustment is 2 inches towards the ground plane GP. In some embodiments, the controller 710 is configured to determine the float adjustment of the portion of the cutterbar 110 prior to the portion of the cutterbar 110 reaching the area where the adjustment is needed, i.e., the controller 710 can be configured to proactively raise or lower the flex arm 201 to, for example, maintain the defined level of float. After determining the float adjustment, the controller 710 can output the gear motor drive signal to the motor(s) 308, 309, 408, 409, 509 to rotate the gear(s) 301, 302, 401, 402, 501, causing vertical displacement at least the portion of the cutterbar 110 by the float adjustment. In some embodiments, the cutterbar 110 may have an operating position that is on, or close to, the ground plane GP; in such cases, the controller 710 may be configured to only output the gear motor drive signal to raise the cutterbar 110 from the operating position, for example to avoid an obstacle, and output another gear motor drive signal to return the cutterbar 110 to the operating position after passing the obstacle. It should thus be appreciated that the controller 710 can utilize signals from the float sensor 220 to adjust the float of the cutterbar 110 via control of the flex arm drive assembly 210, 500.

In some embodiments, the header 100 is coupled to a lift cylinder 230 carried by the chassis 12. The controller 710 may be operably coupled to the lift cylinder 230 and configured to determine that the determined float adjustment exceeds a defined vertical displacement of the flex arm drive assembly 210, 500. For example, the defined vertical displacement of the flex arm drive assembly 210, 500 may be 4 inches in either vertical direction, corresponding to 4 inches of flex. The defined vertical displacement may be due to a variety of factors, including but not limited to physical limitations of the flex arm drive assembly 210, 500. The defined vertical displacement may be a set value that cannot be adjusted or, alternatively, may be a user-defined value that can be adjusted.

When the controller 710 determines that the float adjustment is greater than the defined vertical displacement of 4 inches, such as 6 inches, the controller 710 can output a header height control signal to the lift cylinder 230 to cause vertical displacement of the header 100 by the lift cylinder 230. Lifting of the header 100 by the lift cylinder 230 is commonly referred to as "header height control." In some embodiments, the lift cylinder 230 is coupled to the feeder house 14 and the header 100 is coupled to the feeder house 14 as well. Thus, the header 100 may be coupled to the lift cylinder 230 via connection to the feeder house 14. Generally, vertical displacement of the entire header 100 is slower than vertical displacement of just the flex arm 201 and cutterbar 110 due to the significantly higher mass of the header 100 (and, if attached, the feeder house 14 as well). However, displacing the entire header 100 may be necessary when large float adjustments are needed that cannot be effected by the flex arm drive assembly 210, 500 due to, for example, space restrictions on the header 100.

From the foregoing, it should be appreciated that the flex arm drive assemblies 210, 500 disclosed herein allow selective, linear displacement of the flex arms 201, and thus portions of the cutterbar 110, to float the cutterbar 110 and obtain the desired ground clearance. The construction of the header 100 can be simplified because the movement is linear, rather than arced pivoting. Further, the angle of the cutterbar shoes 203 does not need to be adjusted because the movement is in a vertical plane. Thus, the flex arm drive assemblies 210, 500 provided according to the present disclosure can simplify construction and operation of the header 100 compared to known headers that have pivoting flex arms.

These and other advantages of the present invention will be apparent to those skilled in the art from the foregoing specification. Accordingly, it is to be recognized by those skilled in the art that changes or modifications may be made to the above-described embodiments without departing from the broad inventive concepts of the invention. It is to be understood that this invention is not limited to the particular embodiments described herein, but is intended to include all changes and modifications that are within the scope and spirit of the invention.

The invention claimed is:

1. An agricultural harvester, comprising:
   a chassis;
   a controller; and
   a header carried by the chassis, the header comprising:
   a header frame;
   a flexible cutterbar carried by the header frame;
   a plurality of flex arms coupled to the cutterbar;
   a flex arm drive assembly coupled to at least one of the flex arms and configured to selectively, linearly displace the at least one coupled flex arm in a vertical direction relative to the header frame, the flex arm drive assembly comprising:
      at least one gear configured to rotate;
      a gear rail engaged with the at least one gear and coupled to the at least one coupled flex arm; and
      a motor coupled to the at least one gear and the controller and configured to selectively rotate the at least one gear, the controller being configured to output a gear motor drive signal to the motor to cause selective rotation of the at least one gear, wherein rotation of the at least one gear causes vertical displacement of the at least one coupled flex arm; and
   a float sensor operably coupled to the controller and configured to output float signals corresponding to a clearance of at least a portion of the cutterbar relative to a ground plane, the controller being configured to determine a float adjustment by the at least one coupled flex arm to float at least the portion of the cutterbar at a defined level and output the gear motor drive signal to the motor to cause vertical displacement of at least the portion of the cutterbar by the float adjustment.

2. The agricultural harvester of claim 1, wherein vertical displacement of the at least one coupled flex arm causes a corresponding vertical displacement of at least a portion of the cutterbar.

3. The agricultural harvester of claim 1, wherein the flex arm drive assembly comprises a plurality of gears engaged with the gear rail.

4. The agricultural harvester of claim 3, wherein the plurality of gears comprises a first gear and a second gear that are configured to counter-rotate.

5. The agricultural harvester of claim 4, wherein the flex arm drive assembly comprises a first gear motor coupled to the first gear and configured to rotate the first gear clockwise and a second gear motor coupled to the second gear and configured to rotate the second gear counter-clockwise.

6. The agricultural harvester of claim 1, further comprising a lift cylinder carried by the chassis, coupled to the header, and operably coupled to the controller, the controller being configured to determine that the determined float adjustment exceeds a defined vertical displacement of the flex arm drive assembly and output a header height control signal to the lift cylinder to cause vertical displacement of the header by the lift cylinder.

7. The agricultural harvester of claim 6, further comprising a feeder house carried by the chassis and coupled to the lift cylinder, the header being coupled to the lift cylinder via connection to the feeder house.

* * * * *